Aug. 22, 1961     H. F. GERWIG ET AL     2,997,064
ELECTRICALLY CONTROLLED VALVE

Filed Oct. 17, 1955

Inventors:
Harvey F. Gerwig,
Robert M. Cox,
Fred O. Hosterman
and Rene Rivera
By: Donald W. Banner   Atty.

United States Patent Office 2,997,064
Patented Aug. 22, 1961

2,997,064
ELECTRICALLY CONTROLLED VALVE
Harvey F. Gerwig, Glendale, Robert M. Cox, Northridge, Fred O. Hosterman, Studio City, and Rene Rivera, Reseda, Calif., assignors to Weston Hydraulics, Ltd., North Hollywood, Calif., a corporation of California
Filed Oct. 17, 1955, Ser. No. 540,754
6 Claims. (Cl. 137—620)

This invention relates to a valve, and more particularly to an electromagnetically controlled valve having characteristics making it particularly useful in high temperature operations.

Where valves are used in high temperature atmospheres, it has been found that their life span is relatively limited in view of the fact that seals associated with moving parts of the structure are adversely affected by the high temperature. In addition, where the valve is electromagnetically controlled, it is essential that the solenoid be isolated from the fluid circuit controlled by the valve to minimize the danger of explosions always found where hydraulic fluid vapors at high temperatures are present.

It is therefore one object of the present invention to produce a valve particularly suitable for high temperature operation in which there are no moving seals.

Another object is the provision of a device in accordance with the preceding object which is electromagnetically controlled, and in which the electrical circuit is isolated from the hydraulic fluid circuit.

Another object is the provision of a device in accordance with the preceding objects which is compact, reliable, and relatively inexpensive.

Another object of the present invention is the provision of a device in accordance with the preceding objects in which a portion of the valve body forms part of the magnetic circuit utilized to control fluid flow through the valve.

Other objects and features will be readily apparent to those skilled in the art from the following specification and appended drawings in which.

Figure 3:
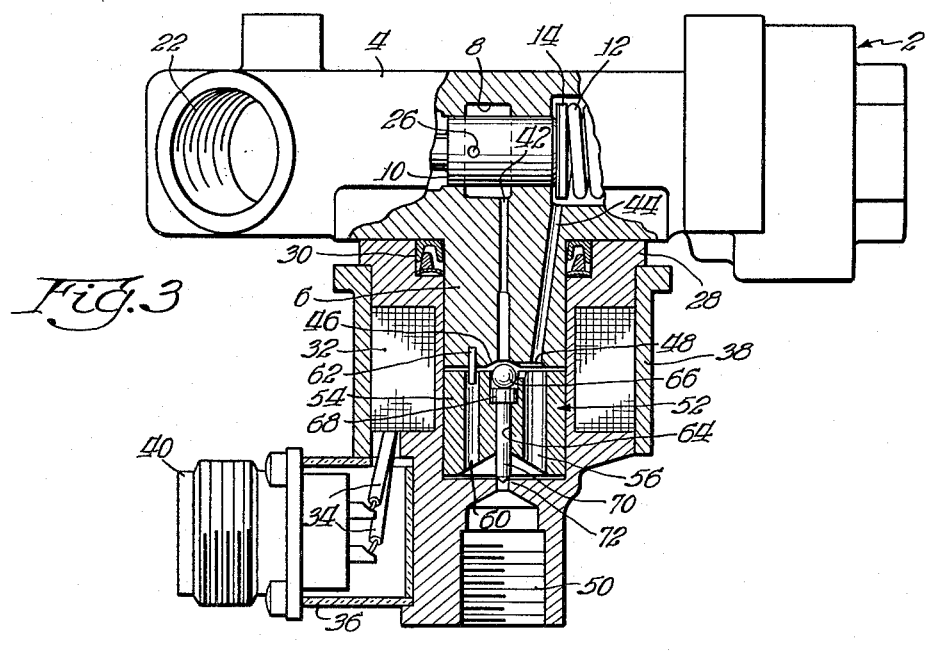
FIGURE 3 is a plan view of the device of the present invention, illustrated partially in section to facilitate the understanding of the device.

The device of the present invention comprises a body 2 which is generally T-shaped, and which comprises a first portion 4 and a second portion 6 extending at right angles thereto. The body 2 is formed of magnetic material, and preferably of stainless steel. The first body portion 4 is provided with an elongated bore 8 extending therethrough, and in which is disposed a longitudinally movable shuttle 10. The wall of the bore 8, and the outer periphery of shuttle 10, are generally cylindrical, the wall of bore 8 being conventionally provided with a plurality of lands which cooperate with associated portions of the shuttle 10 to prevent fluid flow therebetween. Shuttle 10 is further conventionally provided with a groove adapted to permit desired fluid flow therein under certain circumstances, as will be manifest to those skilled in the art. The shuttle 10 is biased toward the left, in the view of FIGURE 2, by a spring 12 which is disposed between a thrust washer 14 carried by an elongated end portion of shuttle 10 and a plug 16 fixedly disposed within an enlarged portion of the bore 8. Suitable seal means 18 is disposed within the bore 8 and in association with the plug 16 to prevent fluid flow therebetween.

Figure 2:
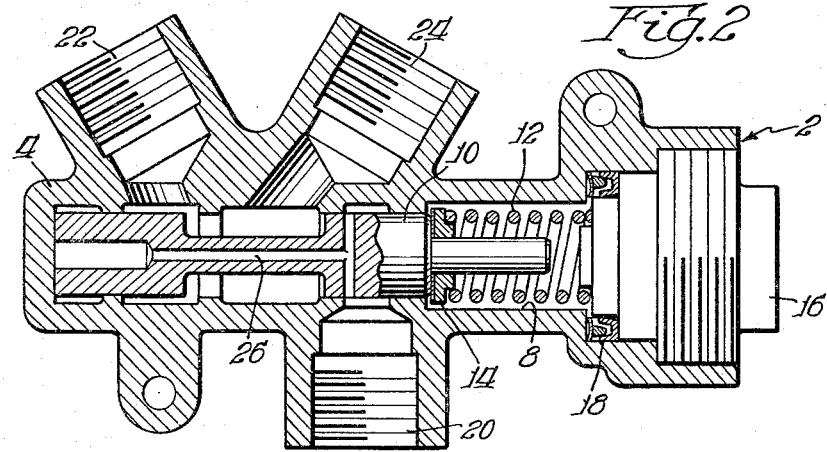
FIGURE 2 is an enlarged sectional view along the plane of line 2—2 of FIGURE 1.
Figure 1:
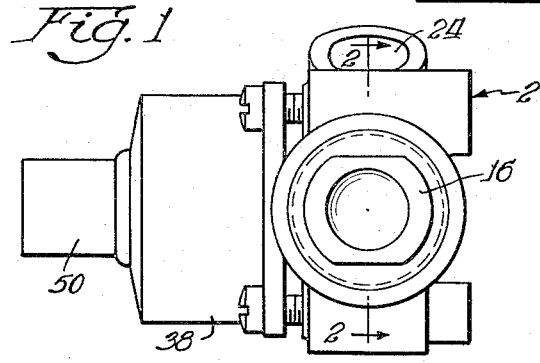
FIGURE 1 is a side view of the device of the present invention.

Body portion 4 is further provided with a pressure port 20 in fluid communication with the bore 8, and a pair of generally Y-disposed ports 22 and 24, also in fluid communication with the bore 8. As best illustrated in FIGURE 2, the shuttle 10 is provided with an internal, generally T-shaped passage 26, the cross portion of which is disposed in fluid communication with the pressure port 20 whereby fluid under pressure may flow through the passage 26 to the left end of the shuttle 10 for a purpose to be subsequently described.

As best shown in FIGURE 3, disposed about the second portion 6 of the body 2 and in close engagement therewith is a generally cup-shaped spool 28 of magnetic material—preferably stainless steel—the spool 28 being fixedly mounted to the body 2 by suitable fastening means, such as bolts. A seal 30 is disposed between the body 2 and the spool 28 to prevent the passage of fluid therethrough. The spool 28 carries an electromagnetic coil 32 disposed thereupon and having leads 34 which project into a tubular spacer 36. The spacer 36 is mounted to the spool 28 and to a generally cylindrical shell 38, carried by the spool 28 and surrounding the electromagnetic coil 32. To the end of the spacer 36 there is attached a suitable connector 40.

As best illustrated in FIGURE 3, the second portion 6 of the body 2 is provided with a passage 42 and a passage 44, both of which are in fluid communication with the bore 8 and the end of portion 6. More particularly, one end of passage 42 is in communication with an annular groove formed in the bore 8 which is in fluid communication with the pressure port 20; the opposite end of passage 42 is provided with a valve seat 46. Similarly, one end of passage 44 is in communication with an enlarged, elongated groove formed in the bore 8, surrounding the spring 12, and with an opposite end 48 adjacent the valve seat 46.

As further illustrated in FIGURE 3, the portion of spool 28 which is the most outwardly extending is provided with a return port 50 adapted to be connected to a sump, and disposed between the port 50 and the passages 42, 44 is an electromagnetically responsive plunger means 52. The plunger means 52 are alined with the outermost end of the second portion 6 of body 2, and with the return port 50, and comprise a plunger body 54 of electromagnetic material having an outer cross-sectional configuration and dimension comparable to that of the second portion 6 of the body 2. The plunger 54 is provided with an opening 56 extending therethrough, one end thereof being alined with—and in communication with—the end 48 of passage 44; the other end of opening 56 is in communication with a generally dish-shaped depression in the outer end of the plunger 54. Plunger 54 is provided with another opening 60 extending therethrough, one end of which receives a pin 62, the opposite end of which is received in a suitable aperture in the second portion 6 of the body 2. The central portion of plunger body 54 is provided with an opening 64 which is generally T-shaped in cross section. Disposed within the enlarged, inner portion of opening 64 is a ball 66 disposed in engagement with the head portion 68 of a generally T-shaped pin 70 which extends through the opening 64. The outermost end of pin 70 is provided with a tapered configuration, as illustrated in FIGURE 3, which is adapted to cooperate with a complementarily shaped valve seat 72 forming the entrance to, and a part of, the return port 50. The normal condition of the device is illustrated in FIGURE 3 in which the tapered end of pin 70 is seated upon the cooperating valve seat 72 whereby fluid flow through the return port 50 is prevented. Simultaneously, the ball 66 is spaced from the valve seat 46 whereby fluid may flow through the passage 42 and into the passage 44. It is essential to note that the plunger body 54 is axially movable within the spool 28, as will be subsequently explained.

With a source of fluid pressure connected to the port 20, pressurized fluid will enter the T-shaped passage 26 in shuttle 10 and fluid under pressure will engage the left end of the shuttle 10, as previously explained. Simultaneously, pressurized fluid from the port 20 will pass through the cross portion of T-shaped passage 26 and into, as shown in FIGURE 3, the passage 42 where it will impinge upon the ball 66. This fluid will then pass into the passage 44 and will fill the chamber surrounding the spring 12, whereby pressurized fluid will be in contact with both ends of the shuttle 10. Inasmuch as the fluid forces at the opposite ends of the shuttle 10 are thereby balanced, the force of spring 12 will maintain the shuttle 10 in its leftward position, as viewed in FIGURE 2.

It is essential to note, as shown in FIGURE 3, that in the normal condition of the device the fluid force on the ball 66 presses the ball, and the pin 70, in an outward direction. The engagement between the head 68 of pin 70 and the plunger body 54 is such that the plunger body 54 is moved outwardly to the position illustrated in FIGURE 3 in which the tapered outer end of the pin 70 is seated upon the valve seat 72, as previously described, so that fluid flow through the return port 50 is prevented.

The normal condition of the device of the present invention having been described above, it will be assumed that port 22 is connected to return and the port 24 is connected to a cylinder. In the normal condition illustrated, it will be obvious that the return port 22 and the cylinder port 24 are in fluid communication, whereby any fluid in the cylinder would be drained out. When the leads 34 are connected to a suitable source of electrical current, upon energization of the coil 32, the electromagnetic flux passing through the spool 28, the portion 6 of the body 2, and the shell 38 causes the plunger body 54 to move upwardly, in the view of FIGURE 3. Such upwardly movement of the plunger body 54 effects corresponding movement of the pin 70, by virtue of the interconnection between the body 54 and the head 68 of the pin 70. This upward movement continues until the ball 66 is firmly seated on the valve seat 46, preventing further fluid flow through the passage 42; simultaneously the tapered end of pin 70 is carried out of engagement with the valve seat 72, permitting fluid flow through the return port 50. As a result of this movement, the passage 44 is no longer connected to the pressure port 20; in distinction, it is directly connected to the return port 50 through the opening 56 in the valve body 54. As a result, the pressure on the right end of shuttle 10, in view of FIGURE 2, is very rapidly dissipated. Inasmuch as the biasing force of spring 10 is minute in comparison to the pressure force exerted on the left end of the shuttle 10, the shuttle 10 will be moved rapidly toward the right, in FIGURE 2, until the end of shuttle 10 engages the plug 16. Upon such movement of the shuttle 10 to the right, the enlarged left end of the shuttle will be moved to a position such that further communication between ports 22 and 24 is interrupted; simultaneously, the pressure port 20 will be directly connected to the cylinder port 24 whereby fluid under pressure will be applied to an associated cylinder connected to port 24 to effect a desired movement thereof. Upon deenergization of the coil 32, fluid under pressure in passage 42 will once again force the ball 66 (and plunger body 54) outwardly and away from the valve seat 46 whereby fluid under pressure may flow through the passage 44 and into engagement with the right end of shuttle 10; simultaneously, the tapered end of pin 70 will be forced once again into engagement with the valve seat 72 whereby fluid flow through the return port 50 will be interrupted. As a result, the fluid pressure at the opposite ends of the shuttle 10 will once again be balanced, and the spring 12 will effect return of the shuttle 10 to the position illustrated in FIGURE 2. Upon such movement, the cylinder port 24 and the return port 22 are once again in communication, as illustrated.

It will therefore be seen that the device of the present invention is such that a portion of the valve body is employed in the magnetic controlling circuit for the valve. This makes the unit very compact and rugged, and also permits disposal of the plunger means within the cup-shaped spool. As a result the plunger means and the electromagnetic coil are isolated from dirt and other undesirable particles, and the electromagnetic coil itself is isolated from the hydraulic fluid circuitry. As a result, the danger of explosions is minimized. Furthermore, when the device of the present invention is utilized at very high temperatures, the useful life of this device is substantially in excess of that of valves known to the prior art inasmuch as the construction of the present device is such that there are no moving seals employed whatsoever, and only two external seals are used.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

We claim:

1. A valve of the type having a plurality of fluid port means and a longitudinally movable shuttle adapted to control the flow of fluid through the ports, comprising a generally T-shaped body of magnetic material having a first portion in which the shuttle is disposed and a second portion, fluid passage means in said body including passage means in said second portion in constant communication with said first portion normally adapted to supply fluid to the opposite shuttle ends, and means adapted to control shuttle movement by venting selectively fluid away from one shuttle end comprising generally cup-shaped spool means of magnetic material surrounding said second body portion, electromagnetic coil means carried by said spool means, and electroresponsive means disposed within said spool means in alignment with said passage means in said second body portion effective to block fluid flow through said passage means in said second portion to one shuttle end and simultaneously vent the one shuttle end upon energization of said coil means.

2. A valve of the type having a plurality of fluid port means including a pressure port and a cylinder port and a longitudinally movable shuttle adapted to control fluid flow through the ports, comprising a generally T-shaped body of magnetic material having a first portion within which the shuttle is disposed and a second portion, fluid passage means in said body normally adapted to supply fluid to the opposite ends of the shuttle including means in said second body portion; and means adapted to control shuttle movement by effecting selective venting of fluid from one shuttle end comprising generally cup-shaped spool means of magnetic material surrounding said second body portion, means in said spool means defining a return port, and means adapted to control communication between at least certain of said means in said second body portion and said return port whereby to effect the selective venting of one shuttle end to the return port comprising electromagnetic coil means carried by said spool, means movable in response to the energization of said coil means disposed within said spool in alignment with said second body portion and said return port including first means normally in engagement with said return port defining means preventing fluid flow therethrough and second means normally spaced from said means in said second body portion, said first and second means being moved upon energization of said coil means respectively to positions in which fluid flow through said return port is permitted and in which fluid flow through said certain of said means in said second body portion is prevented whereby one shuttle end is vented to return upon energization of said coil means.

3. The device defined in claim 2, in which said means in said second body portion comprise means defining a first valve seat therein and in which said means defining a return port include means defining a second valve seat, said means movable in response to the energization of said coil means including a movable plunger body having a means defining a fluid carrying opening therethrough and a second opening, and valve means in said second opening constructed and arranged to engage said second valve seat and prevent fluid flow through said return port upon deenergization of said coil means and to engage said first valve seat during energization of said coil means.

4. The device defined in claim 3 in which said valve means comprise a generally T-shaped pin having a tapered end complementary to said second valve seat and a ball constructed and arranged to cooperate with said first valve seat.

5. A valve of the type having a plurality of fluid port means and a longitudinally movable shuttle positionable in response to the operation of electromagnetic means adapted to control the flow of fluid through the ports, comprising a generally T-shaped body of magnetic material comprising a first portion within which the shuttle is disposed and a second portion, fluid passage means in said second portion in constant communication with said first portion, generally cup-shaped means of magnetic material surrounding said second portion, seal means between said second portion and cup-shaped means, means of magnetic material in said cup-shaped means movable to prevent fluid flow through said fluid passage means to effect positioning of said shuttle, and electrical coil means mounted upon said cup-shaped means operable to effect movement of said last mentioned means.

6. A valve comprising a generally T-shaped valve body of magnetic material comprising a first portion having means defining an elongated opening therein and a second portion, a plurality of fluid ports including a pressure port and a cylinder port in said first portion in communication with said opening, a movable shuttle within said opening adapted to control the flow of fluid through said ports, means communicating said pressure port and one end of said shuttle, means defining a plurality of fluid passages through said second portion in communication with spaced portions of said opening including a first passage in constant communication with said pressure port and a second passage in constant communication with the opposite end of said shuttle, spool means of magnetic material surrounding said second body portion, electromagnetic coil means carried by said spool, means defining a return port in said spool means, and means controlling communication between said passages and said return port comprising a movable plunger of magnetic material disposed in alignment with said second body portion, means defining a first aperture extending through said plunger aligned with said second passage, means defining a second aperture extending through said plunger aligned with said first passage and said return port, and means in said second aperture adapted to block selectively fluid flow through said first passage or said return port comprising valve means effective normally to prevent fluid flow through said return port and to permit fluid flow through said return port and simultaneously prevent fluid flow through said first passage upon energization of said coil means.

References Cited in the file of this patent
UNITED STATES PATENTS

| | | |
|---|---|---|
| 2,335,923 | Dube | Dec. 7, 1943 |
| 2,587,357 | McPherson | Feb. 26, 1952 |
| 2,624,542 | Ghormley | Jan. 6, 1953 |
| 2,624,585 | Churchill | Jan. 6, 1953 |